March 10, 1964  B. STERNLICHT  3,124,395
METHOD AND APPARATUS FOR BYPASSING CRITICAL SPEEDS OF ROTORS
Filed June 27, 1961

Inventor:
Beno Sternlicht,
by Paul A. Frank
His Attorney.

United States Patent Office 3,124,395
Patented Mar. 10, 1964

3,124,395
METHOD AND APPARATUS FOR BYPASSING
CRITICAL SPEEDS OF ROTORS
Beno Sternlicht, Schenectady, N.Y., assignor to General
Electric Company, a corporation of New York
Filed June 27, 1961, Ser. No. 120,088
8 Claims. (Cl. 308—122)

The present invention relates to the support of rotating members and, more particularly, to a method and apparatus for bypassing critical speeds of rotating members.

In U.S. Patent 2,961,277, entitled, "Functional Bearings" granted November 22, 1960, the problem of critical speed of a rotating member is accommodated by utilizing an engageable auxiliary bearing disposed intermediate spaced support bearings in such a manner that as the critical speed of the system is approached, the auxiliary bearing is engaged in a manner to change the critical speed characteristics for the system. In this manner, a new and different critical speed is determined for the system which permits bypassing the vibration attendant the critical speed of the system with the auxiliary bearing disengaged. By selective engagement and disengagement of the auxiliary bearing, the extreme vibration of the defined systems at critical speeds can be avoided.

The critical speed of a system is determined by the elasticity of various members which comprise the system including the rotating member itself, the bearings which support the rotating member, and the pedestal upon which the bearings are mounted. Thus, it will be appreciated that the critical speed can be changed by varying the elasticity of any of these component members. In actual practice, the rotating member's elasticity is usually determined at the time of construction and the same is true with respect to the pedestal. Accordingly, this suggests that changes in bearing elasticity be utilized to bypass the critical speed of a particular rotating system.

The chief object of the present invention is to provide an improved method and apparatus for bypassing the critical speed of rotors.

A further object of the invention is to provide a method and apparatus for bypassing the critical speed of rotors without utilizing auxiliary bearing means.

A still further object of the invention is to provide an improved method and apparatus for bypassing the critical speed of rotors by varying the stiffness of the support bearings. "Stiffness" as utilized herein generally denotes the resistance or the restraint supplied by the lubricant film to shaft motion.

These and other objects of my invention may be more readily perceived from the following description.

Briefly stated, the present invention is directed to a method and apparatus for bypassing the critical speeds of rotors wherein a rotating member is supported by hydrostatic or hydrodynamic bearings whose elasticity may be varied in response to the speed of the rotor to avoid the attendant vibration at critical speeds of the system. As utilized herein, the terms "hydrostatic" and "hydrodynamic" are directed to the manner of pressure generation in the bearings utilizing fluid lubricants including gases.

The attached drawings illustrate preferred embodiments of the invention, in which.

Figure 1:
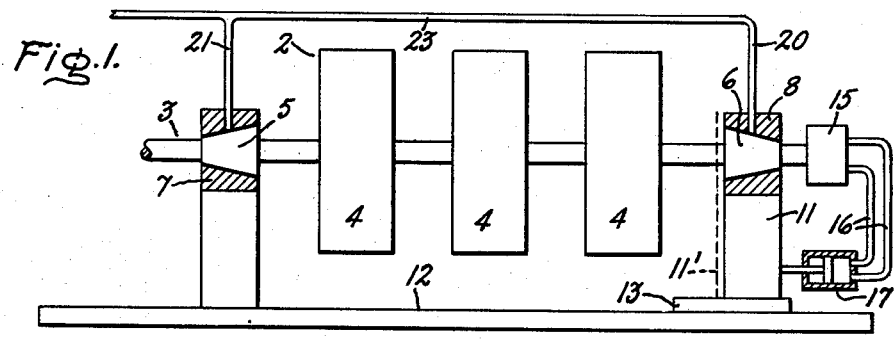
FIGURE 1 is a diagrammatic view, partially in section, of a rotating system for practicing the present invention.

While the present invention is described with respect to systems employing two bearings to support a rotor, it will be appreciated that the present invention may be utilized in systems wherein rotatable members are cantilever mounted in a single bearing or in other systems wherein the rotatable member is supported by a large number of bearings. As previously mentioned, in the present invention, the elasticity of the main support bearings of a rotating system is varied to change the critical speed characteristics of the rotor. In FIGURE 1 this is achieved by changing bearing lubricant film thicknesses. In the apparatus in FIGURE 2, it is achieved by changing the viscosity of the lubricant supplied to the bearings, and in FIGURE 3, a hydrotsatic bearing is shown wherein the stiffness of the bearing is varied by changing the supply lubricant pressure.

In the drawings, FIGURE 1 is a diagrammatic view, partially in section, of a rotatable system employing the present invention. Rotor 2 which includes a shaft portion 3 having a plurality of rotatable members 4 mounted thereon may be supported at the frusto-conical journal portions 5 and 6 of shaft 3 by bearings 7 and 8. Frusto-conical shape bearings 7 and 8 are mounted on a pair of pedestals 10 and 11 which are associated with base 12.

From a study of the apparatus shown in FIGURE 1, it can be seen that lubricant supplied from header 23 to lines 20 and 21 forms a lubricant film between the frusto-conical journal surfaces and the frusto-conical bearing surfaces and the thickness of the film may be varied by lateral movement of the frusto-conical bearing surfaces which changes the clearance between the engaging surfaces. It is well known in the hydrodynamic bearing art that changes in clearance result in changes in fluid pressure in the bearing constructions. Furthermore, decreases in bearing lubricant clearances are usually accompanied by increases in bearing lubricant pressure which, in turn, increases the stiffness of the particular bearing and more rigidly supports the journal surfaces. Accordingly, it can be seen in FIGURE 1 that by moving pedestal 11 with bearing 8 to the dotted position shown at 11′, there is a decrease in the clearance and in the lubricant film thickness between the journal and the bearing surfaces making a more rigid support and, consequently, changing the critical speed of the system.

Lateral movement of pedestal 11 may be achieved by connecting shaft 3 to a speed responsive mechanism, for example, a tachometer 15 responding to certain speed ranges which are known to be the critical speeds of the system with a given clearance between journal and bearing surfaces. At these speed ranges, suitable hydraulic or pneumatic means connected through lines 16 with a hydraulic or pneumatic motor 17 associated with pedestal 11 may move the pedestal on track 12 to the dotted position 11′. In a manner more fully described hereinafter, movement of pedestal 11 avoids the excessive vibration attendant in the system at certain speed ranges which are critical speed ranges. Preferably, at position 11′ the system has different critical speeds and speed responsive means 15 may shift between positions 11 and 11′ to avoid the excessive vibrations at the critical speed ranges of each system defined at these positions.

Figure 2:
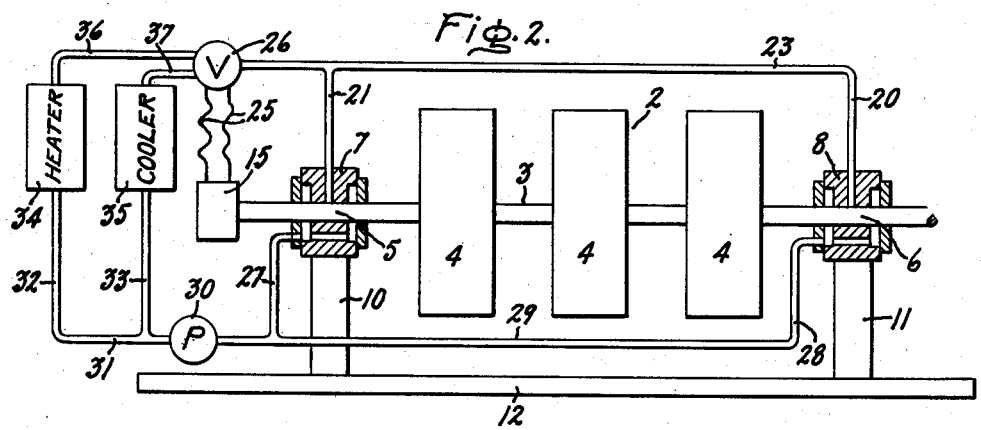
FIGURE 2 is a diagrammatic view, partially in section, of another embodiment of an apparatus for practicing the present invention.

In FIGURE 2, there is shown another embodiment of the invention also utilizing hydrodynamically lubricated bearings. In this embodiment, changes in viscosity of the lubricant from change in temperature of the lubricant supplied to the bearing varies the stiffness of the bearing supports. It will also be appreciated that the present invention may be practiced by other means for changing the viscosity of the lubricant, for example, utilization of multiple sources of lubricants having different viscosities.

In FIGURE 2 like parts of the rotor system are numbered in a manner similar to the system in FIGURE 1. Rotor 2 comprises a plurality of members 4 mounted on shaft 3 which are associated with a tachometer or other speed responsive means 15. The rotor is supported by a pair of bearings 7 and 8 which engage the journals 5 and 6. While in this embodiment of the invention, the journal and rotor surfaces are shown as substantially cylindrical in shape, it will be appreciated that other forms of bearings may be utilized such as bearings having pockets or elliptical cross sections. As previously mentioned, changes in stiffness of the bearing support in this embodiment is achieved by changing the viscosity of the lubricant. Normally, lubricant is supplied through supply lines 20 and 21 associated with supply header 23. The lubricant lubricates the bearing surfaces and the excess fluid may be suitably collected from the bearings in a conventional manner and passed through lines 27 and 28 to return header 29 which supplies the lubricant to a suitable pump 30. Pump 30 may discharge lubricant through line 31 to either supply lines 32 or 33 which are respectively associated with heater 34 or cooler 35. Heated or cooled lubricant may be passed through lines 36 and 37 to three-way valve 26 which determines the header from which the lubricant is to be supplied. Valve 26 in the disclosed embodiment is controlled by speed responsive means 15 connected to valve 26 by electrical conductors 25. Speed responsive means 15, shown in FIGURE 2, by its association with valve 26 during certain speed ranges determines the source of lubricant being supplied to bearings 7 and 8. It is well known that the viscosity of lubricants may change with changes in temperature. It is also common practice to heat and cool lubricants for particular uses. These practices suggest that the present invention may be readily adapted for use in presently known lubrication systems incorporating such heating and cooling means.

As the rotor speed increases in the apparatus in FIGURE 2, speed responsive means 15 which is supplying lubricant of a given temperature actuates valve 26 as the critical speed for the bearing with a given temperature lubricant is reached. The temperature of the lubricant supplied may be increased or decreased depending upon the characteristics of the original supply lubricant so that the critical speed for the first temperature lubricant may be bypassed by the second temperature lubricant which provides different critical speed systems.

Figure 3:
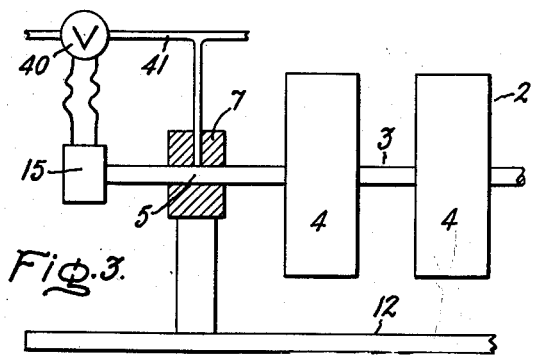
FIGURE 3 is a partial diagrammatic view of the third embodiment of an apparatus for practicing the present invention.

In FIGURE 3 there is shown a partial, diagrammatic view of the system shown in FIGURE 2 employing hydrostatic bearings rather than the hydrodynamic bearings shown in the apparatus in FIGURES 1 and 2. In this particular embodiment, rotor 2 is supported by bearing 7 which engages journal 5. Lubricant from supply line 41 is throttled by valve 40 which is controlled by speed responsive means 15. In this manner, the stiffness of the hydrostatic bearing is controlled by varying the pressure of the lubricant supplied through line 41 and during critical speed ranges, the pressure may be varied by throttle valve 40 in such a manner as to shift the critical speed of the system until the critical speed of the original system (at the first lubricant pressure) is bypassed and valve 40 may change the lubricant supply pressure to the initial supply pressure to avoid the critical speeds of the second system (at the second lubricant pressure).

Figure 4:
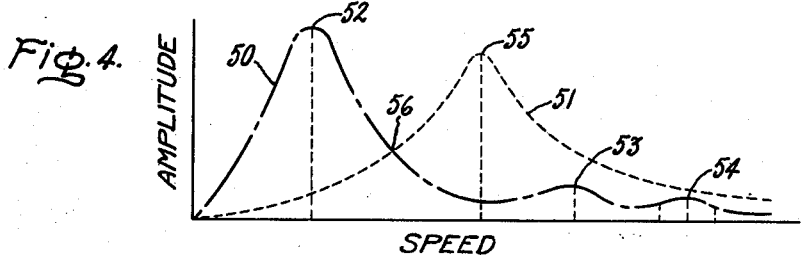
FIGURE 4 is a diagram plotting amplitude of vibration versus speed of rotation of a rotor in a system employing the present invention.

In FIGURE 4, amplitude of vibration is plotted versus speed of rotation and there are shown two curves 50 and 51. Curve 50 illustrates the critical speeds of a system having soft bearings, the first critical speed at point 52 being reached at a relatively low speed. This is followed by a second critical speed at point 53 and a third at point 54. Curve 51 illustrates the operating characteristics of a system with stiffer bearings. The first critical speed in curve 51 is reached at point 55. Curve 51 may have further critical speed points 53 and 54 of curve 50. From a consideration of the curves in FIGURE 4, it is immediately apparent that it is highly desirable to avoid the critical speed at point 52 on curve 50 and this may be achieved by providing a stiff bearing support initially until point 56 is reached. Initially, vibration resulting from bearing elasticity is not severe but as the speed is increased, it is desirable to control bearing stiffness and utilize the characteristics of curve 51. Accordingly, in the apparatus in FIGURE 1, the speed responsive means 15 urges pedestal 11 to position 11′ so that a stiff bearing is initially provided by decreasing the clearance between the bearings and the journals. The decrease in clearance reduces the lubricant film thickness and, consequently, the bearing support is stiffened. At the speed indicated at point 56 in FIGURE 4 which is the first point of intersection between curves 50 and 51, it is desirable to restrict the amplitude of vibration. This may be achieved by speed responsive means 15 in FIGURE 1 which re-positions the pedestal to position 11. Accordingly, at speeds above point 56, the soft bearing characteristics of curve 50 are utilized to avoid the critical speed at point 55 on curve 51. The amplitude of vibration at points 53 and 54 which are the second and third critical speeds, respectively, may not be excessive as shown in FIGURE 4 and it may be desirable to continue the soft bearing support as shown by the position of pedestal 11 in FIGURE 1. However, if it is desired to maintain minimum amplitudes of vibration at all speeds, other curves may be generated by utilizing a plurality of bearing stiffnesses achieved by continually varying the clearance between the journal and the bearing surfaces of the apparatus in FIGURE 1.

It will be appreciated that on slowing the rotor from a high speed, it may be desirable to decrease the speed along curve 50 until the speed at point 56 is reached. At this point, the pedestal may be re-positioned to dotted position 11′ to avoid the first critical speed of the soft system shown at point 52.

With respect to the system shown in FIGURE 2, since the viscosity of the lubricant is usually lower with warm lubricants supplied from heater 34, it may be desirable early in the operation of the system to supply, in response to speed responsive means 15, cool fluid from cooler 35. The fluid passes through line 37, valve 26, header 23 to bearings 7 and 8. As the amplitude of vibration increases to the speed at point 56 in FIGURE 4, softer bearing characteristics are desirable. Accordingly, three-way valve 26 may discontinue the supply of lubricant from cooler 35 and the lubricant from heater 35 may be supplied to the bearings. From this mode of operation, it is clear that the operating procedure utilized with respect to the apparatus in FIGURE 1 wherein lubricant film thickness is varied may be duplicated substantially by changing lubricant viscosity.

Operating curves 50 and 51 may be generated by changing the pressure of the lubricant supplied to the hydrostatic bearing in the apparatus in FIGURE 3. Initially, a stiff bearing support may be achieved by supplying high pressure lubricant to the bearing. When the speed at point 56 in FIGURE 4 is reached, throttle valve 40 may decrease lubricant pressure to bearing 7 in such a manner that the bearing system follows curve 50 to avoid the first critical speed at point 55.

While the present application discloses three ways for changing bearing elasticity, it will be appreciated that the disclosed means for changing the stiffness of a bearing support may be utilized with systems having single bearings and having large number of bearing supports. Similarly, the present invention has been illustrated with respect to utilizing two bearing stiffnesses in the support bearings. In certain cases, the maximum amplitude of vibration may be decreased substantially by varying bearing stiffnesses so that portions of a plurality of amplitude versus speed curves are utilized having extremely low vibration amplitudes.

While I have described preferred embodiments of my invention, it will be understood that the invention is not limited thereto since it may be otherwise embodied within the scope of the appended claims.

What I claim as new and desire to secure by Letters Patent of the United States is:

1. In a method for supporting a rotating member mounted on a plurality of bearings, the steps which comprise in rotating the member, maintaining the stiffness of at least one of the bearings at a predetermined value to determine a critical speed of the rotating member, and changing the stiffness of the bearing to vary the critical speed of the rotating member as the critical speed at the first bearing stiffness is approached.

2. In a method for supporting a rotating member mounted on a hydrodynamic bearing, the steps which comprise rotating the member, maintaining a predetermined lubricant film thickness between the journal and the bearing to determine a critical speed for the member with the first lubricant film thickness and changing the lubricant film thickness when the critical speed at the first film thickness is approached.

3. In a method for supporting a rotating member mounted on a hydrodynamic bearing, the steps which comprise rotating the member, maintaining the viscosity of the lubricant supplied to the bearing at a predetermined value to determine a critical speed of the member, and changing the viscosity of the lubricant supplied to the bearing when the critical speed of the member at the first lubricant viscosity is approached.

4. In a method for supporting a rotating member mounted on a hydrodynamic bearing, the steps which comprise rotating the member, supplying lubricant to the bearing to determine a critical speed at the particular lubricant temperature, and changing the lubricant temperature to change its viscosity thereby changing the critical speed of the member when the critical speed at the first temperature is approached.

5. In a method for supporting a rotating member mounted on a hydrostatic bearing, the steps which comprise rotating the member, maintaining the lubricant pressure at the bearing at a predetermined value to determine a critical speed of the member, and changing the pressure of the lubricant at the bearing to change the critical speed of the member as the critical speed at the first pressure is approached.

6. In a bearing system, the combination of a rotatable member having a journal, a bearing for engaging and continuously supporting said journal at a predetermined stiffness value, means for changing the stiffness of said bearing when the critical speed is approached to achieve a bearing stiffness of different predetermined value, and speed responsive means for controlling the stiffness changing means.

7. In a bearing system, the combination of a rotatable member having a journal, bearing means for engaging and continuously supporting said journal at a predetermined stiffness value, means for changing the lubricant film thickness between the journal and the bearing means when the critical speed is approached to achieve a bearing stiffness of different predetermined value, and speed responsive means for controlling the stiffness of the bearing means by changing the lubricant film between the journal and the bearing means.

8. In a bearing system, the combination of a rotatable member having a journal, bearing means for engaging and continuously supporting said journal at a predetermined stiffness, means for supplying lubricant to said bearing means when the critical speed is approached to achieve a bearing stiffness of different predetermined value, means for varying the pressure of the lubricant in the bearing means, and speed responsive means for changing the pressure of the lubricant in the bearing means.

References Cited in the file of this patent

UNITED STATES PATENTS

| | | |
|---|---|---|
| 2,071,913 | Bentley | Feb. 23, 1937 |
| 2,336,784 | Goodman et al. | Dec. 14, 1943 |
| 2,584,770 | Wilcock | Feb. 5, 1952 |
| 2,711,934 | Rickenmann | June 28, 1955 |
| 2,729,518 | O'Connor | Jan. 3, 1956 |